United States Patent
Mishra et al.

(10) Patent No.: US 9,602,374 B2
(45) Date of Patent: Mar. 21, 2017

(54) SYSTEMS AND METHODS FOR COLLECTING AND ANALYZING DATA TO DETERMINE LINK QUALITY AND STABILITY IN LAYER TWO NETWORKS

(71) Applicants: Ashesh Mishra, San Jose, CA (US); Ankur Saxena, San Jose, CA (US); Mahesh Jethanandani, Saratoga, CA (US)

(72) Inventors: Ashesh Mishra, San Jose, CA (US); Ankur Saxena, San Jose, CA (US); Mahesh Jethanandani, Saratoga, CA (US)

(73) Assignee: Ciena Corporation, Hanover, MD (US)

( * ) Notice: Subject to any disclaimer, the term of this patent is extended or adjusted under 35 U.S.C. 154(b) by 266 days.

(21) Appl. No.: 14/336,884

(22) Filed: Jul. 21, 2014

(65) Prior Publication Data

US 2016/0020973 A1  Jan. 21, 2016

(51) Int. Cl.
*H04L 12/26* (2006.01)

(52) U.S. Cl.
CPC ........ *H04L 43/0811* (2013.01); *H04L 43/106* (2013.01); *H04L 43/0829* (2013.01); *H04L 43/0864* (2013.01)

(58) Field of Classification Search
CPC .............................. H04L 43/08; H04W 28/02
See application file for complete search history.

(56) References Cited

U.S. PATENT DOCUMENTS

| | | | |
|---|---|---|---|
| 7,889,660 B2 | 2/2011 | Bugenhagen | |
| 8,416,763 B1 | 4/2013 | Montini | |
| 8,576,722 B2 | 11/2013 | Bugenhagen | |
| 8,639,842 B1 | 1/2014 | Bagepalli et al. | |
| 8,665,746 B2 | 3/2014 | Mack-Crane et al. | |
| 2005/0099949 A1* | 5/2005 | Mohan | H04L 47/10 370/236.2 |
| 2006/0092847 A1* | 5/2006 | Mohan | H04L 12/2602 370/241.1 |
| 2007/0266233 A1 | 11/2007 | Jethanandani et al. | |
| 2011/0153804 A1* | 6/2011 | Ganesh | G06F 11/0709 709/224 |
| 2012/0057497 A1* | 3/2012 | Song | H04L 43/0858 370/252 |
| 2012/0117248 A1 | 5/2012 | Weis et al. | |
| 2012/0275317 A1 | 11/2012 | Geva et al. | |

(Continued)

FOREIGN PATENT DOCUMENTS

| | | |
|---|---|---|
| CN | 102064981 A | 5/2011 |
| CN | 102158371 A | 8/2011 |

*Primary Examiner* — Shaq Taha
(74) *Attorney, Agent, or Firm* — Clements Bernard Walker PLLC; Christopher L. Bernard; Lawrence A. Baratta, Jr.

(57) ABSTRACT

A method and network element include receiving, at a receiver node, at least one of sender timestamps and sequence numbers in continuity check (CC) frames sent by a sender node; determining receiver timestamps at the receiver node; detecting instability based on one or more of the at least one of sender timestamps and sequence numbers and the receiver timestamps; and performing a remedial action based on the detecting instability. The CC frames can include Bidirectional Forwarding Detection (BFD) or Continuity Check Message (CCM) frames which are regularly transmitted in a session, but do not currently include timestamps or sequence numbers.

18 Claims, 6 Drawing Sheets

(56) References Cited

U.S. PATENT DOCUMENTS

2013/0089090 A1    4/2013   Binetti et al.
2013/0148494 A1*   6/2013   Abbas .................. H04L 47/746
                                                                370/225
2014/0226972 A1*   8/2014   Missett ............... H04L 43/0811
                                                                 370/252

* cited by examiner

| VERS | DIAG | STA | P | F | C | A | D | R | DETECT MULT | LENGTH |
|---|---|---|---|---|---|---|---|---|---|---|
| MY DISCRIMINATOR ||||||||||||
| YOUR DISCRIMINATOR ||||||||||||
| DESIRED MIN TX INTERVAL ||||||||||||
| REQUIRED MIN RX INTERVAL ||||||||||||
| REQUIRED MIN ECHO RX INTERVAL ||||||||||||
| AUTH TYPE ||| AUTH LEN |||| AUTHENTICATION DATA |||||

|   | 1 | 2 | 3 | 4 |
|---|---|---|---|---|
| | 8 7 6 5 4 3 2 1 | 8 7 6 5 4 3 2 1 | 8 7 6 5 4 3 2 1 | 8 7 6 5 4 3 2 1 |
| 1 | MEL / Version (0) | OpCode (CCM=1) | Flags | TLV Offset (70) |
| 5 | Sequence Number (0) ||||
| 9 | MEP ID | | | |
| 13 | | | | |
| 17 | | | | |
| 21 | | | | |
| 25 | | | | |
| 29 | MEG ID (48 octets) ||||
| 33 | | | | |
| 37 | | | | |
| 41 | | | | |
| 45 | | | | |
| 49 | | | | |
| 53 | | | | |
| 57 | | | TxFCf ||
| 61 | TxFCf || RxFCb ||
| 65 | RxFCb || TxFCb ||
| 69 | TxFCb || Reserved (0) ||
| 73 | Reserved (0) || End TLV (0) ||

FIG. 3

SYSTEMS AND METHODS FOR COLLECTING AND ANALYZING DATA TO DETERMINE LINK QUALITY AND STABILITY IN LAYER TWO NETWORKS

FIELD OF THE DISCLOSURE

The present disclosure relates generally to networking systems and methods. More particularly, the present disclosure relates to systems and methods for collecting and analyzing data to determine link quality and stability in Layer 2 networks.

BACKGROUND OF THE DISCLOSURE

Link quality and stability is important in Carrier Ethernet and Multiprotocol Label Switching (MPLS) networks. As such, various techniques exist for delay and loss measurements. For example, delay and loss measurements are defined variously in ITU-T Recommendation Y.1731—Frame loss measurement (ETH-LM) and Frame delay measurement (ETH-DM), IETF RFC 6374—Packet Loss and Delay Measurement for MPLS Networks, etc. These techniques can be used to determine link quality and stability, but have several disadvantages. Specifically, these techniques are limited to specific customers, run on-demand, are not proactive, are not in-band with the data path, do not running continuously, are slow, etc. Additionally, continuity techniques exist for detecting failures or implementing other changes in the data path. For example, these continuity techniques can include Bidirectional Forwarding Detection (BFD) control packets in IETF RFC 5880 and IETF RFC 5881 or Continuity Check Messages (CCM) in IEEE 802.1ag or ITU-T Recommendation Y.1731 (Connectivity Fault Management (CFM)). These continuity techniques (or any other technique that has periodic repetition) however do not check for link quality and stability.

BRIEF SUMMARY OF THE DISCLOSURE

In an exemplary embodiment, a method includes receiving, at a receiver node, at least one of sender timestamps and sequence numbers in continuity check (CC) frames sent by a sender node; determining receiver timestamps at the receiver node; detecting instability based on one or more of the at least one of sender timestamps and sequence numbers and the receiver timestamps; and performing a remedial action based on the detecting instability. The CC frames can include periodically transmitted control frames in a session between the sender node and the receiver node, and the at least one of sender timestamps and sequence numbers can be appended to an end of the CC frames with a delimiter indicating presence of the at least one of sender timestamps and sequence numbers. Optionally, the CC frames can include Bidirectional Forwarding Detection (BFD) frames. The at least one of sender timestamps and sequence numbers can be appended as an Authentication Type-Length-Value (TLV) to the BFD frames. The detecting instability can be based on smaller or larger sequence numbers detected from previous CC frames. Alternatively, the CC frames can include Continuity Check Messages.

The method can further include determining frame loss of the CC frames based on the sequence numbers, wherein each successive CC frame is expected to have a sequence number one greater than a sequence number in a previous CC frame. The detecting instability can include determining sequential frame delay based on a difference between the sender timestamps in successive CC frames; and detecting instability based on deviations in the sequential frame delay from negotiated intervals of the CC frames. The sender timestamps can include a first sender timestamp and a second sender timestamp and the receiver timestamps can include a first receiver timestamp and a second receiver timestamp. The detecting instability can also include utilizing the first sender timestamp and the second sender timestamp to determine a transmission delay in the sender node; and utilizing the first receiver timestamp and the second receiver timestamp to determine a transmission delay in the receiver node.

The first sender timestamp can be indicative of a time when a transmission engine in the sender node is ready to transmit a CC frame; the second sender timestamp can be indicative of a time when the transmission engine sends the CC frame to a physical layer; the first receiver timestamp can be indicative of a time when a receiver engine in the receiver node receives the CC frame; and the second receiver timestamp can be indicative of a time when the receiver engine is done processing the CC frame. The method can further include transmitting data based on the at least one of sender timestamps and sequence numbers to one of a Software Defined Networking controller and a network management system. The performing the remedial action can include performing a proactive network reconfiguration based on the instability exceeding certain thresholds or performing load-balancing or inferring a maximum stable configuration.

In another exemplary embodiment, a network element includes one or more ports communicatively coupled to a sender node in a network path, wherein the network element includes a receiver node; and a controller configured to: receive at least one of sender timestamps and sequence numbers from continuity check (CC) frames sent by the sender node; compute receiver timestamps; detect instability based on one or more of the at least one of sender timestamps and sequence numbers and the receiver timestamps; and cause performance of a remedial action based on the instability. The CC frames can include periodically transmitted control frames in a session between the receiver node and the sender node, and the sender timestamps can be appended to an end of the CC frames with a delimiter indicating presence of the sender timestamps. Optionally, the CC frames can include Bidirectional Forwarding Detection (BFD) frames. The sender timestamps can be appended as an Authentication Type-Length-Value (TLV) to the BFD frames. Alternatively, the CC frames can include Continuity Check Messages.

In yet another exemplary embodiment, a network includes a sender node; and a receiver node communicatively coupled to the sender node and forming a network path therewith; wherein the sender node is configured to append at least one of sender timestamps and sequence numbers to continuity check (CC) frames sent to the receiver node; wherein the receiver node is configured to: determine receiver timestamps with the CC frames; detect instability based on one or more of the at least one of sender timestamps and sequence numbers and the receiver timestamps; and wherein a remedial action is performed based on the instability.

BRIEF DESCRIPTION OF THE DRAWINGS

The present disclosure is illustrated and described herein with reference to the various drawings, in which like refer

FIG. 2 is a block diagram of a Bidirectional Forwarding Detection (BFD) control packet;

FIG. 3 is a block diagram of an exemplary Continuity Check Message (CCM) protocol data unit (PDU);

DETAILED DESCRIPTION OF THE DISCLOSURE

In various exemplary embodiments, systems and methods for collecting and analyzing data to determine link quality and stability in Layer 2 networks are described. The systems and methods measure transient effects to detect instability in a network in addition to the data path fault detection mechanisms of BFD, CFM, etc. Such mechanisms present significant value with the ability to measure the stability of BFD, CFM, etc. sessions and allow operators to take preventive actions prior to network failures. In addition to stability measurement, the information exchanged between peers can be used for providing assurance of security at low overheads by detecting unexpected sequence-numbers and timestamps. The systems and methods allow stability determination in BFD or CFM sessions with a low-overhead solution. The value of the proposal extends from the ability to debug the sources of instability in these sessions (especially in software based implementations) to the ability to analyze, present and act upon information generated directly or derived from the additional pieces of data transmitted with the frames. Again, mechanisms exist to measure frame loss and delay metrics over the data path (BFD LMM/DMM), but such methods do not account for issues specifically relating to the BFD or CCM frame processing and transmission. Existing methods also do not provide adequate information pertaining to the stability of BFD or CCM sessions that can be used for triggering actions such as proactive network reconfiguration. The value of utilizing the systems and methods with BFD or CCM sessions is the repetition and ability to proactively detect instability rather than on demand as with the frame loss and delay metrics.

As described herein, link quality can be detected with the systems and methods through timestamps and/or sequence numbers which can be used to detect frame loss (e.g., missing sequence numbers) and/or frame delay (e.g., differences in the timestamps). Thus, the link quality is an objective measure of the link's performance. Stability or instability is a subjective measure that something may be potentially wrong or in the initial stages. The instability can be detected by monitoring the objective link quality measures over time and noting any variances or trends that could potentially impact traffic. The advantage of the systems and methods is that BFD or CFM sessions are ongoing and can be proactive versus conventional techniques to measure delay and frame loss which are on-demand.

Exemplary Network

Figure 1:
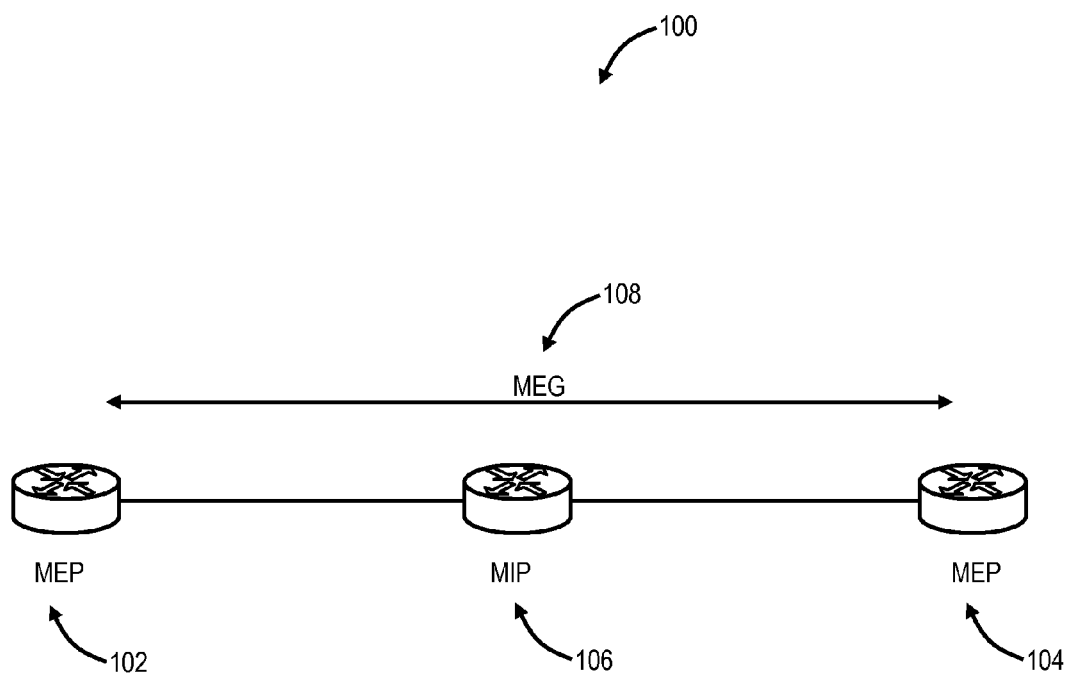
- FIG. 1 is a network diagram of an exemplary Ethernet network configured with Operations, Administration, and Maintenance (OAM) mechanisms.

Referring to FIG. 1, in an exemplary embodiment, a network diagram illustrates an exemplary Ethernet network 100 configured with Operations, Administration, and Maintenance (OAM) mechanisms. For illustration purposes, the Ethernet network 100 includes three interconnected network elements 102, 104, 106. The Ethernet network 100 includes connectivity checks in the OAM mechanisms. In an exemplary embodiment, the connectivity checks can include BFD packets such as defined in IETF RFC 5880, "Bidirectional Forwarding Detection (BFD)" (June 2010) and IETF RFC 5881, "Bidirectional Forwarding Detection (BFD) for IPv4 and IPv6 (Single Hop)" (June 2010), the contents of each are incorporated by reference herein. In another exemplary embodiment, the connectivity checks can include CCMs such as defined in IEEE 802.1ag (2007), "IEEE Standard for Local and Metropolitan Area Networks Virtual Bridged Local Area Networks Amendment 5: Connectivity Fault Management," or ITU-T Recommendation G.8031/Y.1731, "OAM functions and mechanisms for Ethernet based networks" (November 2013), the contents of each are incorporated by reference herein. The OAM mechanisms as described herein can include BFD, IEEE 802.1ag, or G.8031/Y.1731. For example, BFD packets can be used in when the Ethernet network 100 is MPLS-based and CCMs can be used when the Ethernet network 100 is pure Layer-2. The systems and methods described herein contemplate operation with BFD packets, CCMs, or any other type of connectivity check techniques or the like periodically operating in the network 100.

Fundamental to the OAM mechanisms is the concept of a Maintenance Entity (ME) or a Maintenance Association (MA), which is the identified network transport construct spanning the various network nodes underlying a given service or set of services. The OAM mechanisms relies on well-defined messages exchanged between the network elements, specifically and in particular each Maintenance End Point (MEP) that provides origination and termination of the service transport path(s) for a ME or MA. In the example of FIG. 1, the network elements 102, 104 are defined as a MEG End Point (MEP). In the OAM mechanisms, a MEP is configured to source and sink BFD packets, CCMs, etc., i.e. source and sink within a single configured MD (Maintenance Domain), pass-thru if MD Level is higher than the configured level for the MEP, and discard if MD Level is lower. The MEPs 102, 104 are also configured to participate in performance monitoring and live connectivity checks. In a point-to-point network such as illustrated in FIG. 1, there are two MEP nodes at the endpoints, and in other configurations as are also contemplated by the integrity check optimization systems and methods, there may be multiple MEP nodes. Also, a domain having one or more Maintenance Intermediate Point (MIP) nodes that may be bounded by a plurality of MEP nodes. In order that BFD packets, CCMs, etc. flows are appropriately filtered so that they are processed only by the intended domain's nodes, the MEP/MIP population of the Ethernet network 100 is configured appropriately.

The network element 106 is defined as a MIP which resides between MEPs, i.e. the MIP 106 is communicatively coupled between the MEPs 102, 104. A MIP is configured to process and forward BFD packets, CCMs, etc., but does not initiate BFD packets, CCMs, etc. As described herein, MEP and MIP terminology is used for nodes present at endpoints and intermediate points, respectively, in the Ethernet network 100. Also, Ethernet Path terminology is used to denote a point-to-point Ethernet connection between two nodes, e.g. the connection being built using Virtual Local Area Network (VLAN) cross connection or unicast Ethernet Media Access Control (MAC) plus VLAN connection. Additionally, other types of Ethernet paths, such as, for example, Provider Backbone Bridging-Traffic Engineering (PBB-TE), MPLS-TP, and the like are also contemplated by the integrity check optimization systems and methods described herein. Various terminology utilized herein, such as MEP, MIP, etc. is common to each of IEEE 802.1ag-2007, G.8013/Y.1731, BFD, etc. IEEE 802.1ag-2007 utilizes the term Maintenance Association (MA) whereas G.8013/Y.1731 and BFD utilize Maintenance Entity Group (MEG) for the same construct. Those of ordinary skill in the art will recognize while described herein as the MEG 108, the MEG 108 could also be referred to as the MA 108. Generally, the MEG 108 and MA relate to an administrative grouping relative to the MEPs 102, 104. Additionally, IEEE 802.1ag-2007 defines a MEP as a Maintenance association End Point whereas G.8013/Y.1731 and MEF define a MEP as a Maintenance Entity Group End Point. In the following description, MEP may be generally referred to as a Maintenance End Point covering the constructs of IEEE 802.1 ag-2007, G.8013/Y.1731, MEF, BFD, etc.

In one aspect of the OAM mechanisms, BFD packets and CCMs provide mechanisms for connectivity verification. Collectively, the BFD packets and CCMs can be referred to as connectivity check (CC) frames. The CC frames are generally used to verify connectivity of a path. BFD is used to detect faults between two forwarding engines connected by a link, e.g. between the MEPs 102, 104. It provides low-overhead detection of faults even on physical media that do not support failure detection of any kind, such as Ethernet, virtual circuits, tunnels and MPLS Label Switched Paths. BFD does not have a discovery mechanism; sessions must be explicitly configured between the endpoints. BFD may be used on many different underlying transport mechanisms and layers, and operates independently of all of these. Therefore, it needs to be encapsulated by whatever transport it uses. For example, monitoring MPLS LSPs involves piggybacking session establishment on LSP-Ping packets. Protocols that support some form of adjacency setup, such as OSPF or IS-IS, may also be used to bootstrap a BFD session. These protocols may then use BFD to receive faster notification of failing links than would normally be possible using the protocol's own keep alive mechanism. A session may operate in one of two modes: asynchronous mode and demand mode. In asynchronous mode, both endpoints periodically send Hello packets to each other. If a number of those packets are not received, the session is considered down. In demand mode, no Hello packets are exchanged after the session is established; it is assumed that the endpoints have another way to verify connectivity to each other, perhaps on the underlying physical layer. However, either host may still send Hello packets if needed. Regardless of which mode is in use, either endpoint may also initiate an Echo function. When this function is active, a stream of Echo packets is sent, and the other endpoint then sends these back to the sender via its forwarding plane. This is used to test the forwarding path on the remote system.

BFD Packets

Referring to FIG. 2, in an exemplary embodiment, a block diagram illustrates a BFD control packet 150. Again, BFD establishes a session between two network devices to detect failures on the bidirectional forwarding paths between the devices and provide services for upper layer protocols. BFD provides no neighbor discovery mechanism. Protocols that BFD services notify BFD of devices to which it needs to establish sessions. After a session is established, if no BFD control packet is received from the peer within the negotiated BFD interval, BFD notifies a failure to the protocol, which then takes appropriate measures. The following table describes the various fields in the BFD control packet 150:

| | |
|---|---|
| Vers | version number of the BFD protocol, currently 1 |
| Diag | diagnosis word, indicating the reason for the last session status change of the local BFD system |
| Sta | local status of the BFD |
| P | a flag, when parameters are changed, the sender set this flag in the BFD packet, and the receiver must respond to this packet at once |
| F | a flag, this flag must be set in the packet responding to flag P |
| C | a forwarding/control separation flag, once this flag is set, control plane variation does not affect the BFD detection. For example, if the control plane is ISIS, when the ISIS resets/GR, the BFD can continually monitor the link status |
| A | an authentication flag, if this flag is set, it indicates that the session needs to be authenticated |
| D | a query request flag, if this flag is set, it indicates that the sender wishes to adopt a query mode to monitor |
| R | the link preserved bit |
| Detect Mult | a detection timeout multiple, it is used in calculating detection timeout time by the detector |
| Length | a packet length |
| My Discriminator | an identifier for the BFD session connecting to the local side |
| Your Discriminator | an identifier for the BFD session connecting to the remote side |
| Desired Min Tx Interval | the minimum sending interval of the BFD packet supported by the local side |
| Required Min Rx Interval | the minimum receiving interval of the BFD packet supported by the local side |
| Required Min Echo RX Interval | the minimum receiving interval of the Echo packet supported by the local side (it is set to 0 if the local side does not support the Echo function) |
| Auth Type | an authentication type, the current protocol provides: Simple Password, Keyed MD5, Meticulous Keyed MD5, Keyed SHA1, and Meticulous Keyed SHA1 |
| Auth Length | an authentication data length |
| Authentication Date | an authentication data area |

CFM—Continuity Check Messages (CCM)

CFM includes Continuity Check Messages (CCM) which may generally be referred to as "heart beat" messages for CFM. That is, CCMs provide a mechanism to detect connectivity failures in a Maintenance Entity Group (MEG) or a Maintenance Association (MA). CCMs are multicast messages that are confined to a MEG Level or a Maintenance Domain (MD). These messages are unidirectional and do not solicit a response. Each Maintenance End Point (MEP) transmits a periodic multicast CCM inward towards the other MEPs. Conventionally, CCM related attributes are statically configured in IEEE 802.1 ag-2007, G.8013/Y.1731, and the MEF. In order to change the attributes, static reconfiguration is required. Also, MEPs are statically configured in IEEE 802.1 ag-2007, G.8013/Y.1731, MEF 17, etc. In order to add or remove a MEP from a MEG or a MA, static reconfiguration is also needed.

Referring to FIG. 3, in an exemplary embodiment, a block diagram illustrates an exemplary CCM protocol data unit (PDU) 180. As described herein, the CCM PDU 180 is multicast from MEPs to all MIPs and MEPs associated with a given MA/MEG. In an exemplary embodiment, the CCM PDU 180 is a G.8013/Y.1731 Ethernet Continuity Check (ETH-CC) PDU. Generally, CCMs refer to the overall PDU whereas the ETH-CC represents the information contained therein. The ETH-CC function is used for proactive OAM such as to detect loss of continuity (LOC) between any pair of MEPs in a MEG, unintended connectivity between two MEGs (Mismerge), unintended connectivity within the MEG with an unexpected MEP (Unexpected MEP), and other defect conditions (e.g. Unexpected MEG Level, Unexpected Period, etc.). Thus, the CCM is applicable for fault management, performance monitoring, or protection switching applications. In operation, upon reception, a MEP reports a frame with unexpected ETH-CC information. As described herein, CCM transmission may be enabled or disabled in a MEG/MA. When CCM transmission is enabled in a MEG/MA, all MEPs are enabled to periodically transmit frames with ETH-CC information to all other MEPs in the MEG/MA. The CCM transmission period may be the same for all MEPs in the MEG/MA. When a MEP is enabled to generate frames with ETH-CC information, it also expects to receive frames with ETH-CC information from its peer MEPs in the MEG/MA.

The CCM PDU 180 may include a MEG Level (MEL) which is a 3-bit field containing an integer value (0 to 7) that identifies the MEG Level of the CCM PDU 180. A Version field is a 5-bit field containing an integer value that identifies the OAM protocol version. An OpCode is a 1-octet field containing an OpCode that identifies an OAM PDU type, and in the case of the CCM PDU 180 is set to 1. The OpCode is used to identify the remaining content of an OAM PDU. A Flag field is an 8-bit field dependent on the OAM PDU type, and in the case of the CCM PDU 180 contains two information elements for Remote Defect Indication (RDI) and Period. A first bit of the Flag field (bit 8) is a single bit for RDI which is set to 1 to indicate a remote defect, and otherwise is set to 0. The last three bits of the Flag field (bits 3 to 1) indicate a transmission period for the CCM PDU 180 as illustrated in the following table:

| Flags [3:1] | Period Value | Comments |
| --- | --- | --- |
| 000 | Invalid Value | Invalid value for CCM PDUs |
| 001 | 3.33 ms | 300 frames per second |
| 010 | 10 ms | 100 frames per second |
| 011 | 100 ms | 10 frames per second |
| 100 | 1 s | 1 frame per second |
| 101 | 10 s | 6 frames per minute |
| 110 | 1 min | 1 frame per minute |
| 111 | 10 min | 6 frame per hour |

Stability Measurement

BFD and CCMs operate by transmitting and receiving control frames, generally at high frequency, over the data path being monitored. In order to prevent significant data loss due to a data path failure, the tolerance for lost or delayed frames (the Detection Time as described in IETF RFC 5880 for BFD) is set to the smallest feasible value. In certain cases, this Detection Time is comparable to the inter-frame delays caused by random network events such as frame drops or frame processing (transmitter or receiver) delays. The systems and methods propose a mechanism to measure such transient effects to detect instability in the network in addition to the data path fault detection mechanisms of BFD. Such a mechanism presents significant value with the ability to measure the stability of BFD sessions and allows operators to modify the advertised BFD parameters to the fastest stable configuration. In addition to stability measurement, the information exchanged between BFD peers can be used for low-overhead assurance of security. In the foregoing description, reference is made to BFD for the systems and methods, but those of ordinary skill in the art will recognize similar techniques can be used with CCMs, etc.

Figure 4:
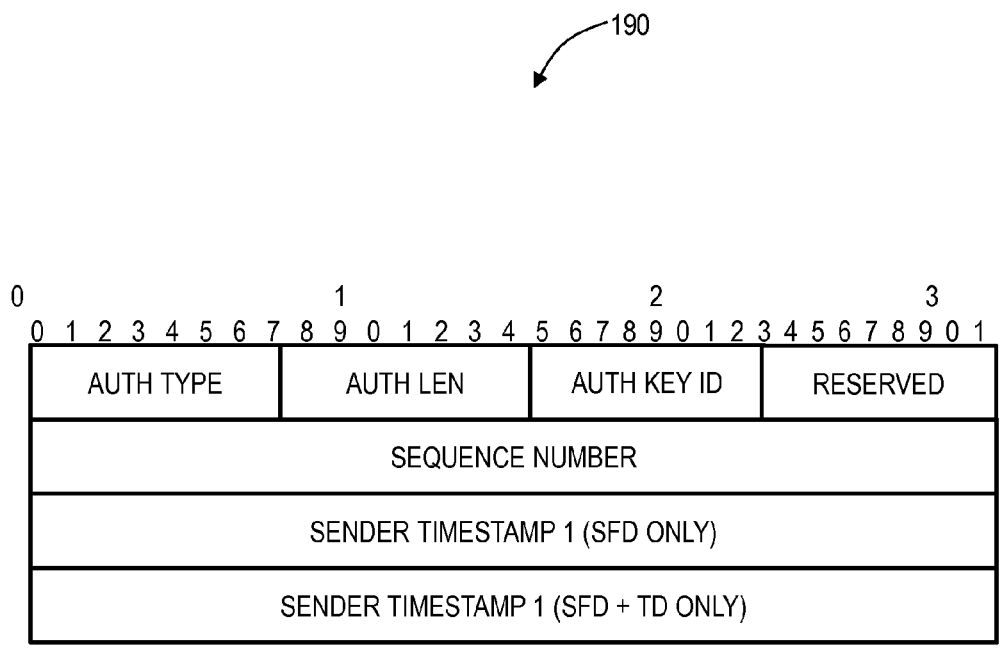
FIG. 4 is a block diagram of an exemplary Type-Length-Value (TLV) for inclusion in the BFD control packet or the CCM PDU.

Referring to FIG. 4, in an exemplary embodiment, a block diagram illustrates an exemplary Type-Length-Value (TLV) 190 for inclusion in the BFD control packet 150 or the CCM PDU 180. The functionality proposed for BFD or CCM stability measurement is achieved by appending one or more of the three pieces of information from the transmitting node for each transmitted frame—Sequence Number, Sender Timestamp 1 and Sender Timestamp 2. These pieces of information may be transmitted as a part of the TLV 190 that is appended to the BFD frames, as a new Authentication TLV (not described in IETF RFC 5880), or directly appended to the BFD payload. The detection is achieved by inserting the Sequence Number and the two Timestamps in the transmitted frame. These pieces of information are compared at the receiver with timestamps taken from that node.

In an exemplary embodiment for BFD, the TLV 190 is not protocol compliant since no protocol compliant TLVs use timestamps. Also, the Auth bit cannot be set to 1 with the Version field set to 1 in a BFD frame since that will require the system to support at least both forms of SHA1 authentication. IETF RFC 5880 Section 6.7 states "Implementations supporting authentication MUST support both types of SHA1 authentication. Other forms of authentication are optional." So, for compliance, the recommendation is to set the BFD Version field to 2 (indicating a proprietary implementation) and then using one of the reserved Auth-types in the authentication TLV (while setting the Auth bit to 1). Specifically, the TLV 190 can be sent in the BFD control packet 150 as part of the authentication.

The TLV 190 in FIG. 4 is for the BFD control packet 150, similar mechanisms can be used for the CCM PDU 180. The TLV 190 includes Auth Type (Authentication Type), which in this case is any valid type not defined in IETF RFC 5880; Auth Len (length of the Authentication Section, in bytes); Auth Key ID (Authentication Key ID in use for this packet); Reserved; Sequence Number; and Timestamps. For Loss Measurement only, the length is set to 4. For Loss and Sequential Frame Delay measurements, the Auth Len is set to 8; and for Loss, Sequential Frame Delay and Transmission Delay on sender node, the Auth Len is set to 12. The Auth Key ID and Reserved are set to zero on transmit and ignored on receipt. The Sequence Number indicates the sequence number for this packet and must be present in each of the TLVs 190. This value is incremented by 1 for every frame transmitted while the session state is UP. A value of 0 indicates a request by sender to reset the sequence number correlation logic at the receiver. The first frame transmitted by the sender may set this field to 0. This also provides protection against replay attacks.

The TLV 190 can support two modes—a Sequential Frame Delay (SFD) Mode and a Sequential Frame Delay and Transmission Delay (SFD+TD) Mode. In the SFD Mode, a Sender Timestamp 1 (SFD-ST) is used which is a Sequential Frame Delay Sender Timestamp (SFD-ST) and is added at the last possible instance on the sender (preferably on the physical layer (PHY)). The difference between two such timestamps on consecutive frames is the Sequential Frame Delay.

In the SFD+TD Mode, there are two sender timestamps. The Sender Timestamp 1 (TD-ST) is the Transmission Delay Sender Timestamp (TD-ST) and is added at the first possible instance on the sender in a frame transmission engine. The Sender Timestamp 2 (SFD-ST) is the Sequential Frame Delay Sender Timestamp (SFD-ST) and is added at the last possible instance on the sender (preferably on the PHY). The difference between TD-ST and the SFD-ST that follows the TD-ST is the Sender Transmission Delay. The difference between two such timestamps on consecutive frames is the Sequential Frame Delay.

In another exemplary embodiment, the first four bytes of this BFD Authentication TLV or any other valid TLV are a delimiter mechanism that helps the receiving node identify the three pieces of information (Sequence Number, Sender Timestamp 1 and Sender Timestamp 2). This can be appended to the BFD control packet 150 in lieu of appearing as a BFD Authentication TLV or to the CCM PDU 180. The delimiter mechanism is used to indicate the three pieces of information follow.

With the TLV 190, this mechanism allows operator to read three measures of stability: Frame Loss, Sequential Frame Delay and Transmission Delay. The Receiver Delay (interval between receipt of a frame on the PHY and the completion of processing in a receiver engine) can be measured using timestamps similar to the Sender Timestamps on the receiver node.

Frame Loss

This measurement counts the number of BFD control frames missed at the receiver due to a transient change in the network such as congestion. Frame-loss is detected by comparing the Sequence Number field in the TLV 190 in successive BFD frames (or CCMs). The Sequence Number in each successive control frame generated on a BFD session by the transmitter is incremented by one. The first BFD Loss-Delay TLV processed by the receiver that has a non-zero sequence number is used for bootstrapping the logic. Each successive frame after this is expected to have a Sequence Number that is one greater than the Sequence Number in the previous frame.

Sequential Frame Delay (SFD)

This measurement is the difference between the SFD-ST on any two consecutive BFD frames that carry the TLV (SFD or SFD+TD mode only) for a session. This is a key metric to determine transient changes in stability of BFD transmission engine or to determine the systems capability of handling the existing load. A significant deviation of SFD from the negotiated transmission interval on the local node (either the sender or the receiver node) indicates potential instabilities in the BFD transmission engine. Based on the SFD measurements, the operator may take action to configure the system to maintain normal operation of the node.

Similar SFD measurements on the receiver can be made using timestamps (SFD-RT). In conjunction with SFD-ST measurements, these can indicate delays caused by data path. While a constant delay may not be indicator of instability, large transient delays can decrease the BFD session stability significantly.

Frame Transmission Delay (TD)

This measurement (TD) is the interval between the timestamp (TD-ST) when the frame transmission timer expires, triggering the BFD control frame generation, and the timestamp (SFD-ST) when the frame reaches the last level in the frame processing logic on the transmitter where the frame can be manipulated. Large variations in the TD measurements over time are indicative of non-deterministic transmission behavior of the BFD engine and can be a pre-cursor to BFD engine instability.

Similar measurements for Receiver Delay (RD) can be made using Sequential Frame Delay Receiver Timestamp (SFD-RT) and Receiver Delay Receiver Timestamp (RD-RT) timestamps, and indicate similar instabilities on the BFD receiver engine.

Transmission and Receive Engines

Figure 5:
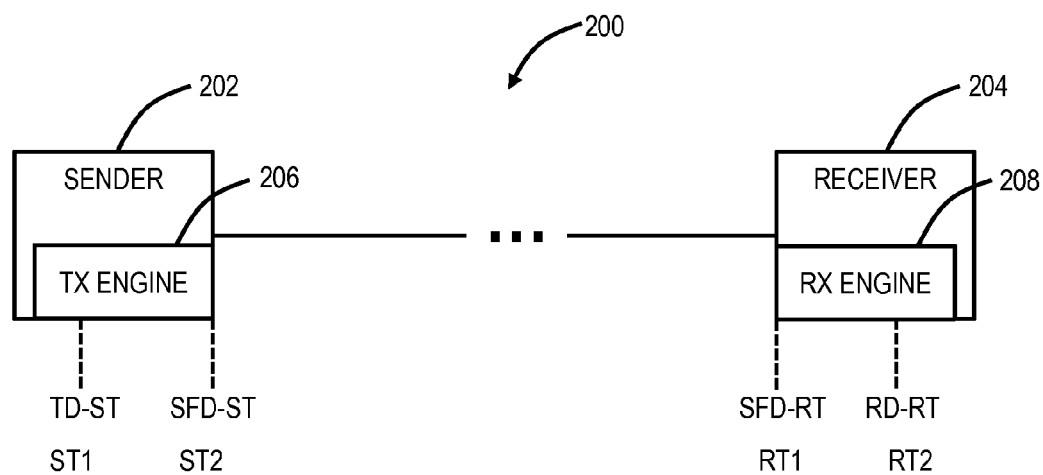
FIG. 5 is a network diagram of a network with a sender node connected to a receiver node.

Referring to FIG. 5, in an exemplary embodiment, a network diagram illustrates a network 200 with a sender node 202 connected to a receiver node 204. The sender node 202 includes a transmission engine 206 and the receiver node 204 includes a receiver engine 208. The engines 206, 208 can include circuitry such as field programmable gate arrays (FPGAs), application specific integrated circuits (ASICs), or the like with unique stored program instructions (including both software and firmware) that perform packet processing including appending and removing the aforementioned timestamps and performing the measurements described herein. Additionally, the nodes 202, 204 can be synchronized with one another using various techniques as are known in the art.

In an exemplary embodiment, the engines 206, 208 can include BFD processing engines. In another exemplary embodiment, the engines 206, 208 can include CCM processing engines. In other exemplary embodiments, the engines 206, 208 can be packet processing engines for any type of packets that are periodically or regularly transmitted between the nodes 202, 204. In this manner, the TLV 190 and associated calculations can be used to proactively determine stability—both of the engines 206, 208 and the nodes 202, 204.

The transmission engine 206 adds two times stamps—TD-ST and SFD-ST—these can be referred to as Sender Timestamp 1 (ST1) and Sender Timestamp 2 (ST2). ST1 is added in the transmission engine 206 when it is ready to transmit a continuity check (CC) frame. The CC frames can be BFD, CCM, etc. frames, i.e. the BFD control packet 150 or the CCM PDU 180. ST2 is added when the CC frame is done in the transmission engine 206 and sent to the PHY in the sender node 202. The receiver engine 208 adds two time stamps—SFD-RT and RD-TD—these can be referred to as Receiver Timestamp 1 (RT1) and Receiver Timestamp 2 (RT2). RT2 is added when the receiver engine 208 receives the CC frame. RT1 does not need to be added to the frame, but can be taken when the receiver engine 208 is complete in processing the CC frame.

At this point, the receiver engine 208 can perform timestamp processing. The receiver engine 208 now has four timestamps for correlation/comparison: ST1, ST2, RT2 and RT1. With these four timestamps, the following can be computed in the receiver engine 208:

| Property | Computation |
| --- | --- |
| Transmission Delay | The difference between ST2 and ST1 indicates the transmission delay for a frame |
| Receiver Delay | The difference between RT1 and RT2 indicates the receiver delay for a frame |
| Inter-frame Delay | The difference between the timestamps in consecutive frames indicates the Inter-frame gap |
| Sequence Numbers | Tracking the sequence numbers to determine if frames are dropped or received out-of-order. |

For Inter-frame Delay, the difference between measured Inter-frame gap and the negotiated Rx interval will indicate the Inter-frame Delay. Additional tracking will be needed for handling this measurement when a frame has been dropped between the current received frame and the last received frame. This issue can be resolved by multiplying the difference between the Sequence numbers of the two frames to the negotiated Rx interval before measuring the Inter-frame delay.

The key to correlating sequence numbers will be the drop counters on the receiver node. For BFD, any increment in the lostThreePlus (e.g., a counter indicative of three or more lost BFDs in a row) will indicate a session timeout (assuming a detect multiplier of 3). An increment in lostTwo (e.g., a counter indicative of two lost BFDs in a row) will indicate a possible session timeout. In addition to the drop counters, the difference between lastLostTimestamp (e.g., a time when the last BFD frame was lost) and currentTimestamp (timestamp at the time the information is displayed) will indicate the time since the last recorded frame drop for that session.

Timestamp correlation is based on the delays detected between certain timestamps within a frame, and between similar timestamps in consecutive frames. Delays beyond certain thresholds will increment corresponding counters. If the delay counter corresponding to a measurement is beyond 200% of negotiated receive interval at the receiver, the BFD, CCM, etc. session may have reported a session timeout (assuming detect multiplier of 3). An increment in this counter, when the timestamp associated with the increment is correlated with the current timestamp, indicates a possible reason for the session timeout.

Counters and Data

Using the information obtained above requires storing some data on the receiver session at the receiver engine 208. The recommendation, in an exemplary embodiment, is to maintain at least some of the following pieces on information in the receiver session data structure. Note, the systems and methods described herein can use some of this data, all of this data, or other derived pieces of data.

| Counter | Data |
|---|---|
| prevSeq | Sequence number in previous received frame |
| prevST1 | ST1 in previous received frame |
| prevST2 | ST2 in previous received frame |
| prevRT2 | RT2 in previous received frame |
| prevRT1 | RT1 in previous received frame |
| lossAndDelayDetect | Flag indicating whether loss and delay need to be monitored |
| dropCountTotal | Total number of dropped frames detected |
| dropCountSingle | Number of single frame drops detected |
| dropCountTwo | Number of times two consecutive dropped frames detected |
| dropCountThreePlus | Number of times three or more consecutive dropped frames detected |
| dropCountMax | Maximum number of consecutive dropped frames detected |
| dropLast | Timestamp (RT1) when last dropped frame detected |
| outOfSeqTotal | Total out-of-sequence frames detected |
| dropLast | Timestamp (RT1) when last out-of-sequence frame detected |
| delayTx50 | Number of times transmission delay was more than 50% of negotiated Rx interval |
| delayTx100 | Number of times transmission delay was more than 100% of negotiated Rx interval |
| delayTx200 | Number of times transmission delay was more than 200% of negotiated Rx interval |
| delayTxLast | ST2 for last detected transmission delay |
| delayRx50 | Number of times receiver delay was more than 50% of negotiated Rx interval |
| delayRx100 | Number of times receiver delay was more than 100% of negotiated Rx interval |
| delayRx200 | Number of times receiver delay was more than 200% of negotiated Rx interval |
| delayRxLast | RT1 for last receiver delay detected |
| delayST1_50 | Number of times Inter-frame delay using ST1 was more than 50% of negotiated Rx interval |
| delayST1_100 | Number of times Inter-frame delay using ST1 was more than 100% of negotiated Rx interval |
| delayST1_200 | Number of times Inter-frame delay using ST1 was more than 200% of negotiated Rx interval |
| delayST1_Last | ST2 for last detected Inter-frame delay using ST1 |
| delayRT1_50 | Number of times Inter-frame delay using RT1 was more than 50% of negotiated Rx interval |
| delayRT1_100 | Number of times Inter-frame delay using RT1 was more than 100% of negotiated Rx interval |
| delayRT1_200 | Number of times Inter-frame delay using RT1 was more than 200% of negotiated Rx interval |
| delayRT1_Last | RT1 for last Inter-frame delay using RT1 detected |
| delayST2_50 | Number of times Inter-frame delay using ST2 was more than 50% of negotiated Rx interval |
| delayST2_100 | Number of times Inter-frame delay using ST2 was more than 100% of negotiated Rx interval |
| delayST2_200 | Number of times Inter-frame delay using ST2 was more than 200% of negotiated Rx interval |
| delayST2_Last | ST2 for last detected Inter-frame delay using ST2 |
| delayRT2_50 | Number of times Inter-frame delay using RT2 was more than 50% of negotiated Rx interval |
| delayRT2_100 | Number of times Inter-frame delay using RT2 was more than 100% of negotiated Rx interval |
| delayRT2_200 | Number of times Inter-frame delay using RT2 was more than 200% of negotiated Rx interval |
| delayRT2_Last | RT2 for last Inter-frame delay using RT2 detected |

Proactive Monitoring

Figure 6:
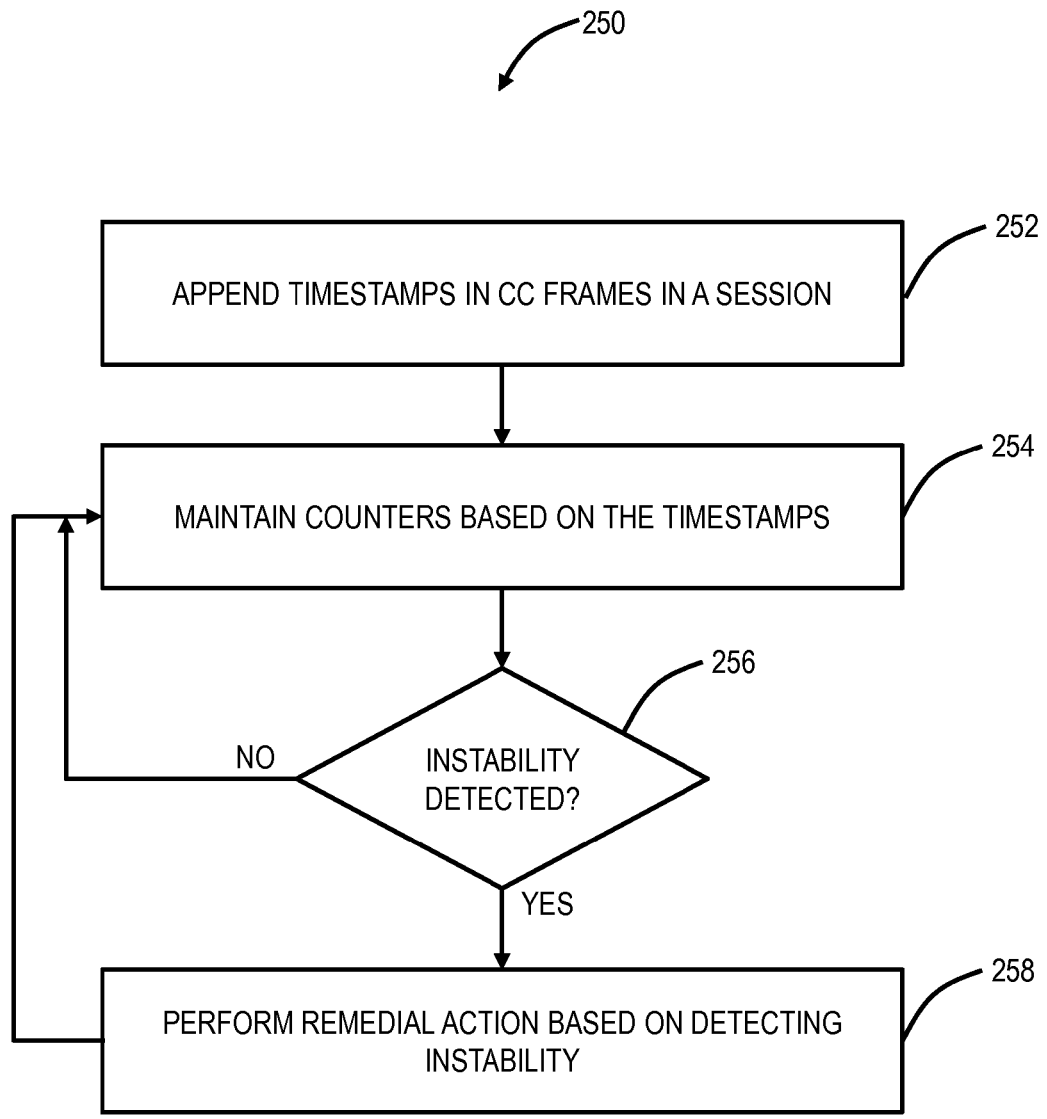
FIG. 6 is a flowchart of a proactive monitoring method using timestamps in continuity check (CC) frames.

Referring to FIG. 6, in an exemplary embodiment, a flowchart illustrates a proactive monitoring method 250 using timestamps in CC frames as described herein. Once the data mentioned above has been collected, it can be used in various ways to improve performance and proactively detect stability issues between the nodes 202, 204. When a session between the nodes 202, 204, fails, the cause can be from one of two categories: physical link or node failures, or transient failures. Of these two categories, the transient failures are (as the name suggests) difficult to determine. Using the systems and methods described herein, transient failures can be identified or can be indicated. This ability helps reduce response times to debug such transient failures.

The proactive monitoring method 250 includes appending timestamps in CC frames in a session (step 252). Again, the CC frames can include BFD, CCMs, etc.—any frames that are regularly or periodically transmitting in a session. These CC frames are appended with the timestamps as described herein. The proactive monitoring method 250 includes maintaining counters or some other data structure based on the timestamps (step 254). The counters or the other data structure can be used to proactively detect instabilities, transients, etc. If there is instability detected (step 256), the proactive monitoring method 250 can include performing a remedial action based thereon (step 258). The remedial action can include, without limitation, proactive network reconfigurations, load-sharing based on stability, faulting sessions, indicating preferable paths based on stability, raising alarms/warnings for maintenance, etc.

For BFD, for example, the proactive monitoring method 250 allows the identification of network instabilities affecting BFD sessions by calculating metrics such as: BFD frames lost per session per unit of time; Consecutive BFD frames lost per session; Number of times the SFD, TD or RD exceeded certain delay thresholds; Statistics (such as max, average, standard deviation, etc.) of SFD, TD or RD. These metrics can be utilized in various ways such as: Proactive network reconfiguration based on instability exceeding certain thresholds of BFD stability; intelligent load-balancing of BFD configuration based on stability metrics by indicating or inferring the maximum stable configuration before the instability exceeds certain thresholds; Faulting BFD sessions based on instability exceeding certain thresholds; and Identification of preferable network links for data path based on preferable BFD stability metrics.

The data from a set of receiver nodes 204 and the associated receiver engines 208 can be collected in a centralized processing location (possible, for example, in a Software Defined Networking (SDN) deployment or in a network monitoring system) allowing better automated analytics, combine data presentation, and autonomous decisions relating to network areas affected by the BFD sessions or the like. The information exchanged between the nodes 202, 204 can be used for providing low-overhead assurance of security by detecting unexpected sequence-numbers and timestamps. For example, a sequence number that is significantly larger or smaller than expected in the duration from the last received frame can indicate a potential man-in-the-middle attack.

This proactive monitoring method 250 allows operators to determine the stability of BFD sessions with a low-overhead solution. The value of the proposal extends from the ability to debug the sources of instability in BFD sessions (especially in software based implementations) to the ability to analyze, present and act upon information generated directly or derived from the additional pieces of data transmitted with the BFD frames. This proactive monitoring method 250 describes methods for collecting and analyzing data pertaining to the stability of BFD sessions, and methods for using the data to offer rich functions that allow the users of the proactive monitoring method 250 to make advanced decisions while provisioning and maintaining the network. The proactive monitoring method 250 also defines methods that autonomously take actions pertaining to network based on the data collected by the described methods.

BFD is widely used in MPLS and IP data networks to detect network failures. The proactive monitoring method 250 leverages the always-on and periodic nature of BFD frame processing in such networks to provide additional data to measure and analyze the stability of such sessions. The importance of the proactive monitoring method 250 lies in the ability to provide measurements of stability of BFD sessions. These measurements can be used for proactive reconfiguration of networks to prevent BFD from indicating false-positives for faults arising from BFD instability instead of real network failures. They also allow load-balancing of networks to allow optimum number of BFD monitored network logical elements such as MPLS LSPs. The proactive monitoring method 250 also describes methods for extracting information relating to assurances of security of the BFD sessions.

Exemplary Network Element

Figure 7:
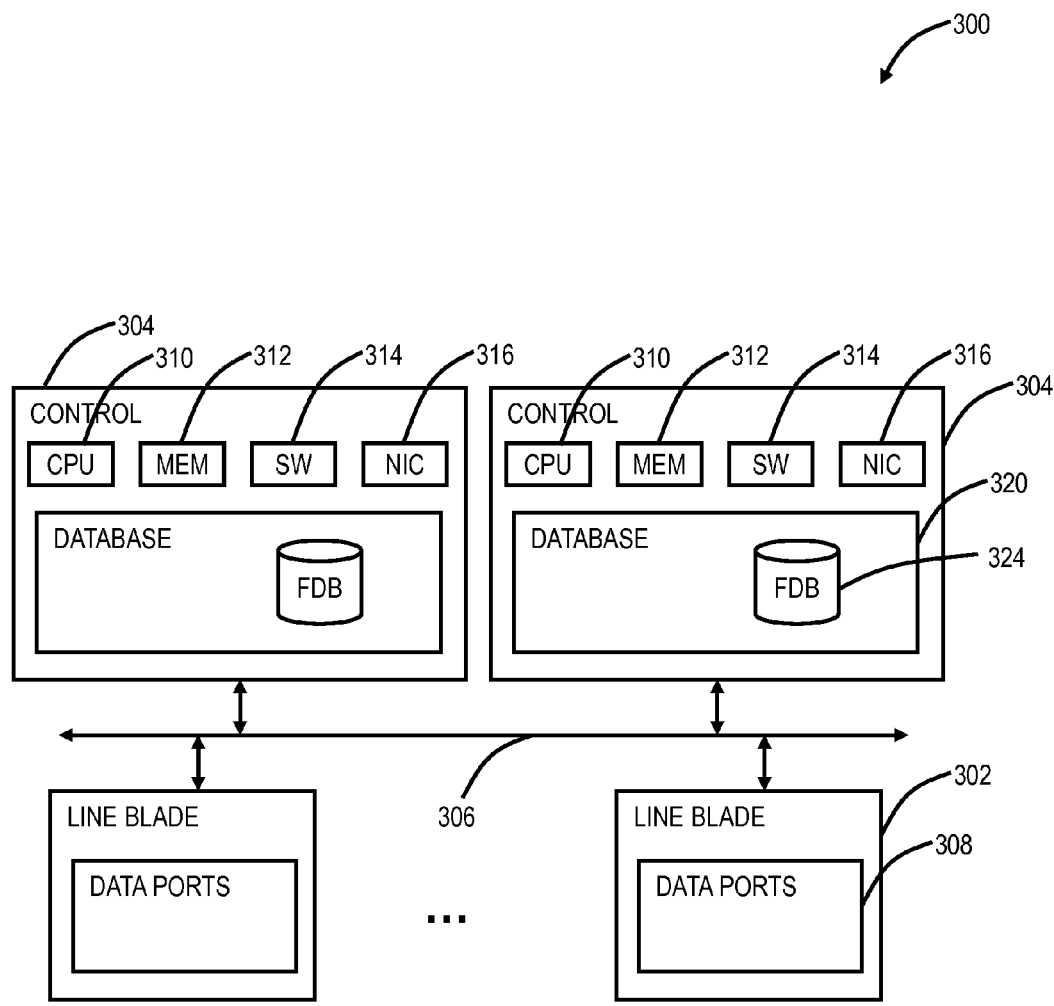
FIG. 7 is a block diagram of an exemplary implementation of a network element for the nodes in the Ethernet network of FIG. 1 or the network of FIG. 5.

Referring to FIG. 7, in an exemplary embodiment, a block diagram illustrates an exemplary implementation of a network element 300 for the nodes 102, 104, 106. In this exemplary embodiment, the network element 300 is an Ethernet network switch, but those of ordinary skill in the art will recognize that other types of network elements and other implementations are contemplated, such as, for example, a layer two switch integrated within an optical network element. In this exemplary embodiment, the network element 300 includes a plurality of blades 302, 304 interconnected via an interface 306. The blades 302, 304 are also known as line cards, line modules, circuit packs, pluggable modules, etc. and refer generally to components mounted within a chassis, shelf, etc. of a data switching device, i.e. the network element 300. In another exemplary embodiment, the functionality of each of the blades 302, 304 may be integrated within a single module, such as in the layer two switch integrated within an optical network element. Each of the blades 302, 304 may include numerous electronic devices and optical devices mounted on a circuit board along with various interconnects including interfaces to the chassis, shelf, etc. Two exemplary blades are illustrated with line blades 302 and control blades 304. The line blades 302 generally include data ports 308 such as a plurality of Ethernet ports. For example, the line blade 302 may include a plurality of physical ports disposed on an exterior of the blade 302 for receiving ingress/egress connections. Additionally, the line blades 302 may include switching components to form a switching fabric via the backplane 306 between all of the data ports 308 allowing data traffic to be switched between the data ports 308 on the various line blades 302. The switching fabric is a combination of hardware, software, firmware, etc. that moves data coming into the network element 300 out by the correct port 308 to the next network element. "Switching fabric" includes switching units, or individual boxes, in a node; integrated circuits contained in the switching units; and programming that allows switching paths to be controlled.

The control blades 304 include a microprocessor 310, memory 312, software 314, and a network interface 316 to operate within the network 100. Specifically, the microprocessor 310, the memory 312, and the software 314 may collectively control, configure, provision, monitor, etc. the network element 300. The network interface 316 may be utilized to communicate with an element manager, a network management system, etc. Additionally, the control blades 304 may include a database 320 that tracks and maintains provisioning, configuration, operational data and the like. The database 320 may include a forwarding database (FDB) 322. In this exemplary embodiment, the network element 300 includes two control blades 304 which may operate in a redundant or protected configuration such as 1:1, 1+1, etc. In general, the control blades 304 maintain dynamic system information including Layer two forwarding databases, protocol state machines, and the operational status of the ports 308 within the network element 300. In an exemplary embodiment, the blades 302, 304 are configured to implement the integrity check optimization method 200 as described herein. The network element 300 can be implemented as the MEPs 102, 104 or the MIP 106 and implement the systems and methods described herein.

Specifically, the network element 300 can be the MEPs 102, 104 or the MIP 106 based on provisioning and configuration. The network element 300 can include one or more ports communicatively coupled to an end node in a network path; and a controller configured to: append sender timestamps to continuity check (CC) frames in a sender node; utilize receiver timestamps with the CC frames in a receiver node; monitor a plurality of counters based on the sender timestamps and the receiver timestamps in the receiver node; detect instability based on the plurality of counters; and perform a remedial action based on the detecting instability.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method, comprising:
   receiving, at a receiver node, at least one of sender timestamps and sequence numbers in continuity check (CC) frames sent by a sender node;
   determining receiver timestamps at the receiver node;
   detecting instability based on one or more of the at least one of sender timestamps and sequence numbers and the receiver timestamps; and
   performing a remedial action based on the detecting instability;
   wherein the CC frames comprise periodically transmitted control frames during an entire session between the sender node and the receiver node for continuity, and the at least one of sender timestamps and sequence numbers are appended to an end of the CC frames with a delimiter indicating presence of the at least one of sender timestamps and sequence numbers, and wherein the at least one of sender timestamps and sequence numbers are sent on an ongoing basis during the session,
   wherein the detecting instability comprises:
      determining sequential frame delay based on a difference between the sender timestamps in successive CC frames; and
      detecting instability based on deviations in the sequential frame delay from negotiated intervals of the CC frames.

2. The method of claim 1, wherein the CC frames comprise Bidirectional Forwarding Detection (BFD) frames.

3. The method of claim 2, wherein the at least one of sender timestamps and sequence numbers are appended as an Authentication Type-Length-Value (TLV) to the BFD frames.

4. The method of claim 3, wherein
   the detecting instability is based on smaller or larger sequence numbers detected from previous CC frames.

5. The method of claim 1, wherein the CC frames comprise Continuity Check Messages.

6. The method of claim 1, further comprising:
   determining frame loss of the CC frames based on the sequence numbers, wherein each successive CC frame is expected to have a sequence number one greater than a sequence number in a previous CC frame.

7. The method of claim 1, wherein the sender timestamps comprise a first sender timestamp and a second sender timestamp and the receiver timestamps comprise a first receiver timestamp and a second receiver timestamp.

8. The method of claim 7, wherein the detecting instability comprises:
   utilizing the first sender timestamp and the second sender timestamp to determine a transmission delay in the sender node; and
   utilizing the first receiver timestamp and the second receiver timestamp to determine a transmission delay in the receiver node.

9. The method of claim 7, wherein:
   the first sender timestamp is indicative of a time when a transmission engine in the sender node is ready to transmit a CC frame;

the second sender timestamp is indicative of a time when the transmission engine sends the CC frame to a physical layer;

the first receiver timestamp is indicative of a time when a receiver engine in the receiver node receives the CC frame; and the second receiver timestamp is indicative of a time when the receiver engine is done processing the CC frame.

10. The method of claim 1, further comprising:

transmitting data based on the at least one of sender timestamps and sequence numbers to one of a Software Defined Networking controller and a network management system.

11. The method of claim 1, wherein the performing the remedial action comprises performing a proactive network reconfiguration based on the instability exceeding certain thresholds.

12. The method of claim 1, wherein the performing the remedial action comprises:

performing load-balancing or inferring a maximum stable configuration.

13. A network element, comprising:

one or more ports communicatively coupled to a sender node in a network path, wherein the network element comprises a receiver node; and a controller configured to:

receive at least one of sender timestamps and sequence numbers from continuity check (CC) frames sent by the sender node;

compute receiver timestamps;

detect instability based on one or more of the at least one of sender timestamps and sequence numbers and the receiver timestamps; and cause performance of a remedial action based on the instability;

wherein the CC frames comprise periodically transmitted control frames during an entire session between the sender node and the receiver node for continuity, and the at least one of sender timestamps and sequence numbers are appended to an end of the CC frames with a delimiter indicating presence of the at least one of sender timestamps and sequence numbers, and wherein the at least one of sender timestamps and sequence numbers are sent on an ongoing basis during the session, and wherein the instability is detected by a determination of sequential frame delay based on a difference between the sender timestamps in successive CC frames; and detection of the instability based on deviations in the sequential frame delay from negotiated intervals of the CC frames.

14. The network element of claim 13, wherein the CC frames comprise Bidirectional Forwarding Detection (BFD) frames.

15. The network element of claim 13, wherein the sender timestamps are appended as an Authentication Type-Length-Value (TLV) to the BFD frames.

16. The network element of claim 13, wherein the CC frames comprise Continuity Check Messages.

17. A method, comprising:

receiving, at a receiver node, at least one of sender timestamps and sequence numbers in continuity check (CC) frames sent by a sender node;

determining receiver timestamps at the receiver node;

detecting instability based on one or more of the at least one of sender timestamps and sequence numbers and the receiver timestamps;

determining frame loss of the CC frames based on the sequence numbers, wherein each successive CC frame is expected to have a sequence number one greater than a sequence number in a previous CC frame; and performing a remedial action based on the detecting instability;

wherein the CC frames comprise periodically transmitted control frames during an entire session between the sender node and the receiver node for continuity, and the at least one of sender timestamps and sequence numbers are appended to an end of the CC frames with a delimiter indicating presence of the at least one of sender timestamps and sequence numbers, and wherein the at least one of sender timestamps and sequence numbers are sent on an ongoing basis during the session.

18. The method of claim 17, wherein the CC frames comprise Bidirectional Forwarding Detection (BFD) frames.

* * * * *